United States Patent [19]

Kato et al.

[11] Patent Number: 5,568,035
[45] Date of Patent: Oct. 22, 1996

[54] VARIABLE-CAPACITANCE POWER SUPPLY APPARATUS

[75] Inventors: Katsuhisa Kato, Koshigaya; Toshihiko Onozawa, Koga, both of Japan

[73] Assignee: Sony/Tektronix Corporation, Tokyo, Japan

[21] Appl. No.: 314,464

[22] Filed: Sep. 28, 1994

[30] Foreign Application Priority Data

Oct. 15, 1993 [JP] Japan .................................... 5-281631

[51] Int. Cl.$^6$ .............................. H02M 7/00; H02M 3/18
[52] U.S. Cl. .................. 320/1; 363/59; 307/110
[58] Field of Search .................... 320/1, 15–18, 320/5–7; 307/110; 363/59–60

[56] References Cited

U.S. PATENT DOCUMENTS

| | | | |
|---|---|---|---|
| 3,579,074 | 5/1971 | Richell | 320/1 |
| 3,755,711 | 8/1973 | Fendt | 324/51 |
| 3,818,309 | 6/1974 | Ichikawa | 307/110 |
| 4,451,743 | 5/1984 | Suzuki et al. | 307/110 |
| 4,689,734 | 8/1987 | Lang | 320/1 |
| 5,003,244 | 3/1991 | Davis, Jr. | 320/17 |
| 5,008,798 | 4/1991 | Harvey | 363/59 |
| 5,063,340 | 11/1991 | Kalenowsky | 320/1 |
| 5,095,223 | 3/1992 | Thomas | 363/60 |
| 5,119,010 | 6/1992 | Shirata et al. | 320/1 |
| 5,161,094 | 11/1992 | Bruder et al. | 320/15 |
| 5,170,129 | 12/1992 | Nobue et al. | 324/678 |
| 5,179,289 | 1/1993 | Sridharan | 363/60 |
| 5,187,421 | 2/1993 | Naito | 320/1 |
| 5,255,660 | 10/1993 | Vogel et al. | 307/110 |
| 5,422,558 | 6/1995 | Stewart | 320/7 |
| 5,461,297 | 10/1995 | Crawford | 320/1 |

*Primary Examiner*—Peter S. Wong
*Assistant Examiner*—K. Shin
*Attorney, Agent, or Firm*—Smith-Hill and Bedell

[57] ABSTRACT

A variable-capacitance power supply apparatus has an inexpensive structure for variably supplying a desired high power to a load by selecting an appropriate total capacitance for storing charge. A number "n" (an arbitrary integer) of series-coupled capacitors each having capacitance C are independently charged to produce an appropriate output voltage. The total capacitance Cs of the series-coupled capacitors is obtained as Cs=C/n. The total charge Q stored in the series-coupled capacitors is proportional to the total capacitance Cs. The series-coupled capacitors are selectively charged to produce an appropriate output voltage and the desired high power to be supplied to the load.

3 Claims, 2 Drawing Sheets

5,568,035

VARIABLE-CAPACITANCE POWER SUPPLY APPARATUS

BACKGROUND OF THE INVENTION

The present invention relates to a power supply apparatus, and in particular to a variable-capacitance power supply apparatus for storing charge to supply an instantaneous high power to a load.

Safety testing of circuits against excessive power requires producing and measuring such excessive power. FIG. 1 is a simplified schematic circuit diagram of a test system for testing short-circuit or breakdown characteristics of a DUT (device under test) 10, such as an insulated gate bipolar transistor (IGBT), a high current resistor, a motor coil or the like. The short-circuit test system supplies a high voltage across the output terminals of the DUT 10, such as between the collector and emitter of an IGBT, to measure the breakdown voltage thereof. The short-circuit test system includes a voltage source 11, a voltmeter 13, an ammeter 15, and a switch 12 for switching the voltage input from the voltage source 11. Where the DUT 10 is an IGBT, a pulse generator 14 supplies pulses to the gate of the IGBT to turn on or off the IGBT. Measurement of the characteristics of the DUT 10 by applying a high voltage thereto needs an appropriate high voltage source apparatus.

A commercially available AC power supply provides 50/60 Hz and 100 V power. One method of obtaining a DC voltage higher than 100 V is to rectify a step-up-transformed AC input to charge a smoothing capacitor. The peak voltage across the smoothing capacitor is equal to the maximum output voltage from a capacitor charger. In order to increase the peak output voltage it is necessary to increase the maximum output voltage of the capacitor charger. Such a high voltage output capacitor charger is expensive in construction.

In a short-circuit test an excessive short-circuit current flowing through DUT 10 may destroy or cause damage to other associated circuit elements. The total energy W stored in a capacitor depends on the amount of charge Q stored on the capacitor, i.e., $W=(\frac{1}{2})QV$ where V is the voltage across the capacitor. The amount of charge Q is proportional to the capacitance C, i.e., $Q=CV$ where C is the capacitance of the capacitor. The quantity CR is a time constant for discharging the smoothing capacitor, where R is the resistance of the load. The smaller the capacitance C, the faster the current flowing through the load is reduced.

Thus, what is desired is a variable-capacitance power supply apparatus having an inexpensive structure for variably supplying a desired high power to a load by selecting an appropriate total capacitance for storing charge.

SUMMARY OF THE INVENTION

Accordingly the present invention provides a variable-capacitance power supply apparatus having a plurality of series-coupled capacitors with a corresponding plurality of DC power supply charge circuits for independently charging each of the plurality of series-coupled capacitors. A corresponding plurality of detectors detect the respective voltages across each of the plurality of capacitors. The nodes between adjacent ones of the series-coupled capacitors are coupled to one end of the series and to an output terminal. A controller responsive to the values detected by the detectors independently controls the plurality of DC power supply charge circuits to produce an appropriate output power at the output terminal, which is connected to a load or device under test, in accordance with a selected total capacitance of the series-coupled capacitors.

The objects, advantages and other novel features of the present invention are apparent from the following detailed description when read in conjunction with the appended claims and attached drawing.

DESCRIPTION OF THE PREFERRED EMBODIMENT

Figure 1:
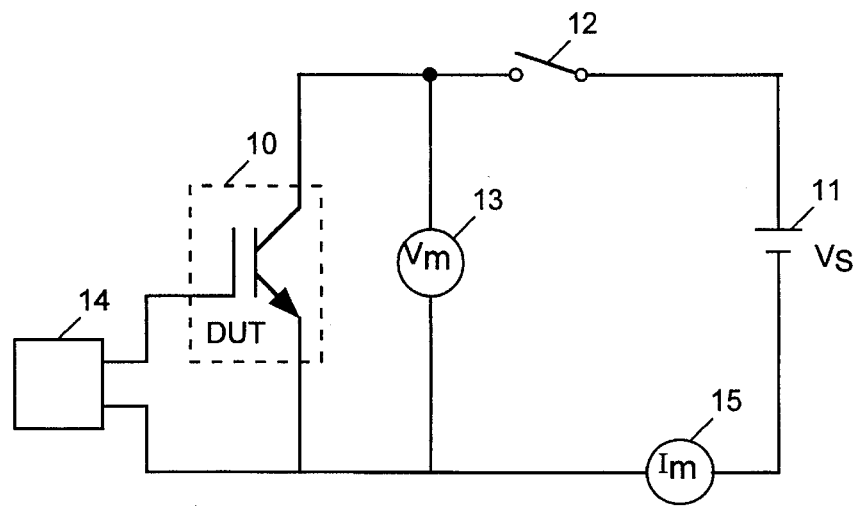
FIG. 1 is a simplified schematic circuit diagram of a conventional short-circuit test system.
Figure 2:
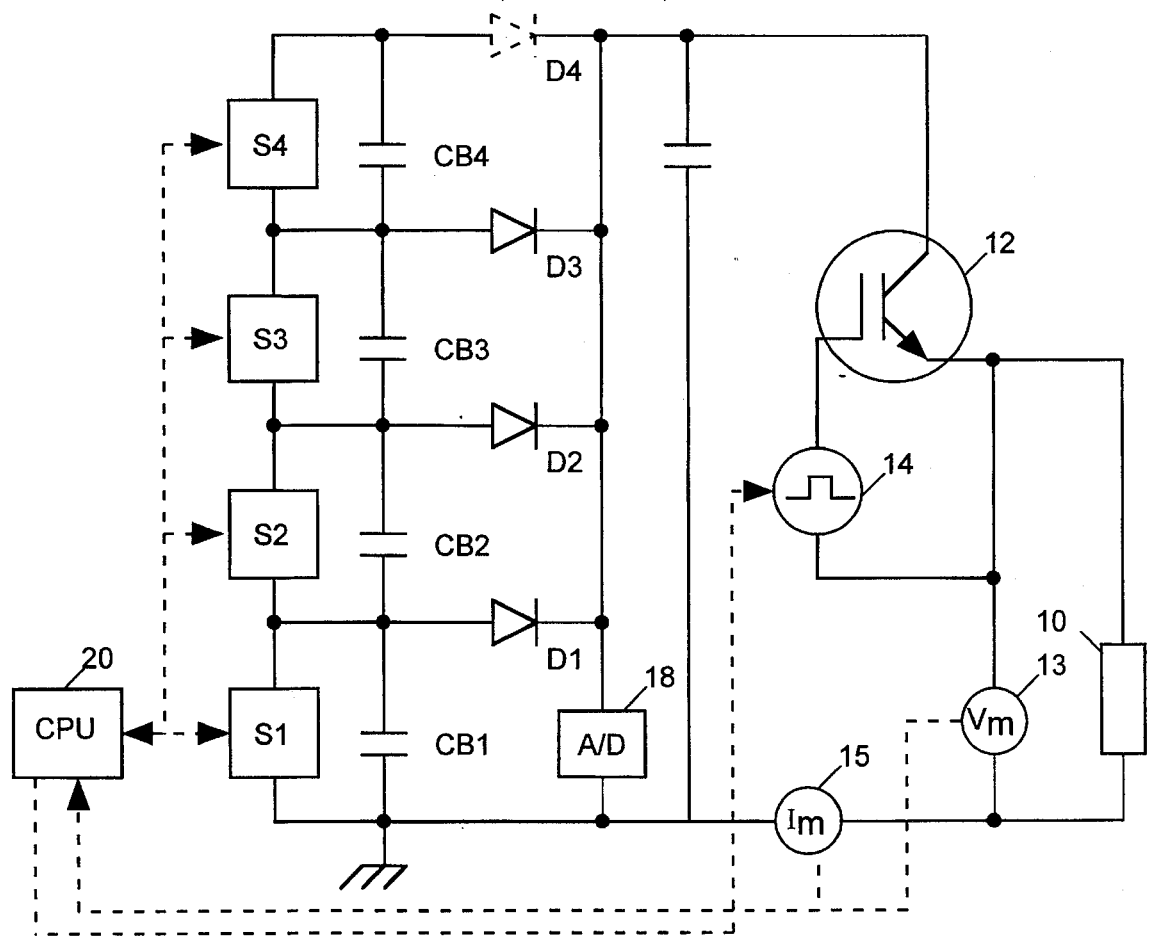
FIG. 2 is a schematic circuit diagram of a variable-capacitance power supply apparatus according to the present invention.

Referring now to FIG. 2 a plurality of series-coupled capacitor banks CB1, CB2, CB3 . . . CBn are charged by respective DC power supply charge circuits S1, S2, S3 . . . Sn. Four capacitor banks and four DC power supply charge circuits are shown for convenience of description, although n may be any arbitrary integer. The DC power supply charge circuits S1–S4 are described hereinbelow in further detail with reference to FIG. 3. A switch 12, which may be a semiconductor device, controls an output current from the capacitor banks CB1–CB4 to a load (or DUT) 10. While the capacitor banks CB1–CB4 are charged by the DC power supply charge circuits S1-S4, the switch 12 is kept in the off state. On the other hand the switch 12 is turned on to supply the output current to the load 10. The switch 12 is suitably implemented by a high power switching IGBT (insulated gate bipolar transistor), as shown.

A voltmeter (Vm) 13 measures the voltage across the load 10 and an ammeter (Im) 15 measures the current flowing through the load 10. The voltmeter 13 and ammeter 15 typically include an analog-to-digital converter to send digitized data of a measured value to a CPU (central processing unit) 20. The CPU 20 controls a pulse generator 14 to generate a pulse to be coupled to the gate of the IGBT 12 which controls the switching operation of the IGBT 12. A compensation capacitor 16 compensates for noise that is caused by the inductance of conductor paths. An analog-to-digital converter 18, including an attenuator circuit (not shown), detects the output voltage from the capacitance banks CB1–CB4 of the voltage source, which digital data representing the output voltage is provided to the CPU 20.

A diode D1 causes the capacitor bank CB1 to be charged only by the DC power supply charge circuit S1 by blocking the current from the other power supplies S2–S4. Similarly a diode D2 causes the capacitor bank CB2 to be charged only by the DC power supply charge circuit S2. Thus, the capacitor banks CB1, CB2, CB3 and CB4 are independently charged by the DC power supply charge circuits S1, S2, S3 and S4 respectively. Since the capacitor bank CB4 may be charged only by the DC power supply charge circuit S4, diode D4 is optional and may be replaced with a conductive line. The reference voltage terminal of the DC power supply charge circuit S1 is grounded, but the reference voltage terminals of the other DC power supply charge circuits S2–S4 are coupled to the output terminals of the lower DC power supply charge circuits S1–S3 respectively. The CPU 20 independently controls the output voltages of the DC power supply charge circuits S1–S4 to adjust the voltages of the capacitor banks CB1–CB4 respectively.

This adjustment provides an appropriate output voltage Vo and an appropriate total capacitance Cs of the capacitor banks. As described above, the energy of a capacitor is (½)QV where Q=CV, C being a capacitance of the capacitor, V being a voltage across the capacitor and Q being a charge stored on the capacitor. As the number of the series-coupled capacitor banks is increased, the total capacitance Cs is reduced, so that it is possible to minimize the total capacitance Cs on the basis of a desired output voltage Vo. The following Table 1 shows the relation between the output voltage Vo and the total capacitance of the series-coupled capacitor banks CB1–CB4 which can be selectively used for contribution to the output voltage Vo in the described embodiment.

TABLE 1

| OUTPUT VOLTAGE | TOTAL CAPACITANCE Cs | | | |
|---|---|---|---|---|
| Vo | 1 CB | 2 CBs | 3 CBs | 4 CBs |
| 0–450 V | 2.2 mF | 1.1 mF | 0.73 mF | 0.55 mF |
| 450–900 V | N.A. | 1.1 mF | 0.73 mF | 0.55 mF |
| 900–1350 V | N.A. | N.A. | 0.73 mF | 0.55 mF |
| 1350–1800 V | N.A. | N.A. | N.A. | 0.55 mF |

For convenience of description assume that each of the capacitor banks CB1–CB4 has the same capacitance of 2.2 mF. In fact each of the CBs may have a different capacitance from each of the others. The total capacitance Cs of n (a desired integer) series-coupled capacitors, each having the same capacitance of C, is obtained as Cs=C/n. When the four capacitor banks CB1–CB4 are charged to produce an output voltage Vo, the charge Q stored on the capacitor banks is CsVo=CVo/4. This is only one fourth of the charge CVo in the case where only one capacitor bank is charged to the voltage Vo. For example, when the output voltage Vo=400 V is required and only one capacitor bank is charged to 400 V, the capacitance Cs is 2.2 mF. On the other hand when four series-coupled capacitor banks are charged to 400 V, each of the four capacitor banks is charged to 100 V and the total capacitance Cs is only 0.55 mF. This reduced capacitance is advantageous for some cases, such as for short-circuit testing, because the short-circuit current from the capacitor is reduced and associated circuit elements are protected from damages due to the heat generated by the short-circuit current. If the number of the series-coupled capacitor banks is increased, the variable steps of the total capacitance Cs also are increased.

Figure 3:
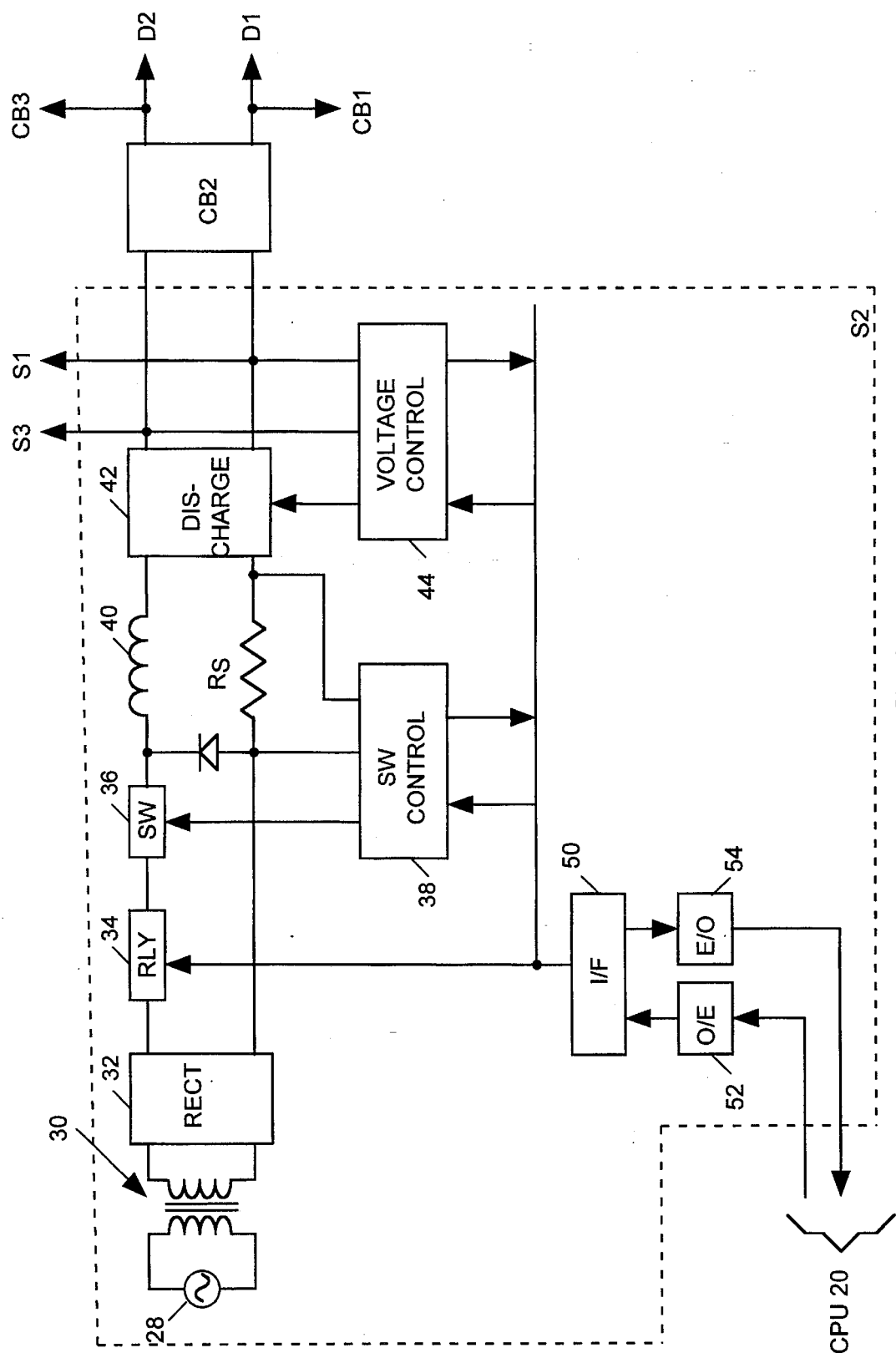
FIG. 3 is a block diagram of a DC power supply charge circuit for the variable-capacitance power supply apparatus according to the present invention.

Referring to FIG. 3, each DC power supply charge circuit receives commercially available AC power from a source 28, which AC power is transformed by a step-up transformer 30 and rectified by a rectifier 32 to produce DC power. A relay 34 controls turn-on or turn-off of the DC output power supply circuit. A switching circuit 36 operates in response to a switching controller 38 to generate pulses. A coil 40 and the associated capacitor bank CB constitute a smoothing circuit. A discharging circuit 42 discharges the charge stored in the capacitor bank CB when necessary. The discharging circuit 42 typically includes a series-coupled circuit of a controllable switch and a discharging resistor. A voltage control circuit 44 detects the voltage across the capacitor bank CB to control the switching control circuit 38 and the discharging circuit 42 under the control of the CPU 20. For example, when the capacitor bank CB is excessively charged, the discharging circuit 42 discharges the capacitor bank CB. When the capacitor bank CB is excessively discharged, the switching control circuit 38 controls the switching circuit 36 to charge the capacitor bank CB. Thus, each DC power supply charge circuit functions as a programmable voltage source circuit. The voltage control circuit 44 typically includes an analog-to-digital converter (not shown) to generate digital data representing the detected voltage. The digital data from the voltage control circuit 44 is transmitted by way of an interface 50 to the CPU 20.

The switching control circuit 38 monitors the voltage across a current sensing resistor Rs. When the voltage across the current sensing resistor Rs exceeds a predetermined value, the switching control circuit 38 turns off the switching circuit 36 to stop generating pulses. The switching control circuit 38 typically includes an analog-to-digital converter (not shown) to produce digital data representing the voltage across the current sensing resistor Rs, and that digital data also is sent by way of the interface circuit 50 to the CPU 20. The data transmission between the CPU 20 and the interface circuit 50 is suitably performed by an optical communicating means, such as an O/E converter 52 and an E/O converter 54, in order to eliminate EMI effects or the like.

As described above, each of the capacitor banks C1–CBn and their associated circuits has the same circuit structure. Therefore it is easy and efficient to design and manufacture the circuit. The CPU 20 independently monitors the voltage across each of the plurality of capacitor banks CB1–CBn by way of the voltage control circuit 44 to accurately and independently control the voltage of each of the capacitor banks.

Thus, the present invention provides a variable-capacitance power supply apparatus having a simple structure and capable of selectively varying capacitance for storing charge to supply an appropriate high power to a load.

What is claimed is:

1. A power supply apparatus comprising:
   a plurality of series-coupled capacitors having one end thereof grounded and the other end coupled to an output terminal;
   means for independently charging each of the plurality of series-coupled capacitors;
   means for detecting a voltage across each of the plurality of capacitors;
   means for coupling the nodes between adjacent ones of the plurality of series-coupled capacitors to the output terminal; and
   means responsive to the voltages detected by the detecting means for controlling the charging means to produce an appropriate output power at the output terminal in accordance with a selected total capacitance of the plurality of series-coupled capacitors.

2. The power supply apparatus as recited in claim 1, wherein the coupling means comprises a plurality of diodes, the anodes thereof coupled to the respective nodes between adjacent ones of the series-coupled capacitors and the cathodes thereof coupled together and to the other end of the plurality of series-coupled capacitors, and a switch circuit between the common cathodes of the diodes and the output terminal.

3. The power supply apparatus as recited in claim 2, wherein the coupling means further comprises an additional diode coupled between the other end of the series-coupled capacitors and the common cathodes of the diodes.

\* \* \* \* \*